United States Patent [19]

Yip

[11] 4,096,883
[45] Jun. 27, 1978

[54] CLOSED-CENTER CONTROLLER AND NEUTRAL BYPASS ARRANGEMENT THEREFOR

[75] Inventor: James K. Yip, Richfield, Minn.

[73] Assignee: Eaton Corporation, Cleveland, Ohio

[21] Appl. No.: 717,735

[22] Filed: Aug. 24, 1976

[51] Int. Cl.² ............................................. B62D 5/08
[52] U.S. Cl. .................... 137/596.13; 60/384; 91/467; 180/132; 137/339; 137/625.24
[58] Field of Search ............... 60/384, 456, 494; 91/467; 180/132; 137/339, 596.12, 596.13, 625.24; 418/61 B

[56] References Cited

U.S. PATENT DOCUMENTS

| Re. 25,126 | 2/1962 | Charlson | 137/625.24 X |
| 2,718,903 | 9/1955 | Noon et al. | 137/625.17 |

Primary Examiner—Alan Cohan
Assistant Examiner—Gerald A. Michalsky
Attorney, Agent, or Firm—L. J. Kasper

[57] ABSTRACT

A closed-center controller is disclosed, especially of the type utilized in hydrostatic power steering systems. The controller includes valving which, in the neutral position, defines a bypass passage communicating inlet fluid through the interior of the hollow, primary valve member to the tank port of the controller. The bypass passage includes a variable bypass orifice having a maximum flow area in the neutral position of the valving and decreasing to zero as the valving is displaced from the neutral position. The variable bypass orifice permits the passage of just enough fluid, typically in the range of about 0.25 gpm to about 0.5 gpm, to minimize the temperature difference between the controller valving and the remainder of the hydraulic system, thus minimizing the possibility of thermal seizure of the valving within the controller.

9 Claims, 6 Drawing Figures

CLOSED-CENTER CONTROLLER AND NEUTRAL BYPASS ARRANGEMENT THEREFOR

BACKGROUND OF THE DISCLOSURE

The present invention relates to fluid controllers, and more particularly, to fluid controllers of the closed-center type.

Although it will become apparent from the following description that the present invention may be utilized in many types of closed-center fluid controllers, it is especially advantageous when used with a closed-center steering control valve in a hydrostatic power steering system, and will be described in connection therewith.

As concern over the efficient utilization of energy has increased, so has the popularity of closed-center steering control valves, i.e., those which block the inlet flow in the neutral position. Closed-center steering control valves permit the use of variable displacement pumps (either pressure-compensated or pressure and flow compensated), which can operated at a standby condition when there is no demand for pressurized fluid, thus substantially reducing the input power consumed by the pump.

It is now common practice, especially on mobile equipment, to combine in one system the hydrostatic power steering circuit and various other hydraulic functions, such as cranes, backhoes, front-end loaders, etc., some of which are utilized simultaneously with the steering circuit, and some of which are not.

A problem which has arisen in connection with the use of closed-center steering control valves concerns the temperature of the steering control valve itself, relative to the remainder of the hydraulic circuit, and especially, relative to the temperature of the circulating hydraulic fluid. It has been found that, if the other portions of the hydraulic circuit are pressurized and operating at fairly high flow rates, the temperature of the circulating hydraulic fluid may rise to about 50° F. above the temperature of the steering control valve within a relatively few minutes. When the steering control valve is subsequently opened, the substantially warmer hydraulic fluid entering the steering control valve will cause the valve member to warm more rapidly than the housing, possibly resulting in thermal seizure between the valve member and the housing.

Accordingly, it is an object of the present invention to provide a closed-center controller, such as a steering control valve, which is capable of being maintained at approximately the same temperature as the hydraulic fluid in the remainder of the hydraulic circuit during periods when the fluid controller is in the neutral position.

It is a more specific object of the present invention to provide a fluid controller which bypasses a very small amount of hydraulic fluid through its valving, when in the neutral position, to minimize rapid increases in the temperature of the valve members.

In many hydraulic systems, a single pump provides pressurized fluid to a hydrostatic steering system, as well as other hydraulic circuits, by means of a priority flow control valve. See for example U.S. Pat. No. 3,455,210, assigned to the assignee of the present invention. In such systems, when the power steering circuit is in neutral, and the other hydraulic circuit is pressurized, leakage through the priority flow control valve to the power steering circuit typically results in a pressure buildup at the inlet port of the steering control valve. Such pressure buildups have been considered undesirable, and as a result, it has been common practice to maintain extremely close tolerances in the priority valve in an attempt to minimize leakage to the steering circuit.

Accordingly, it is another object of the present invention to provide a fluid controller which will reduce the tendency for a pressure buildup to occur at its inlet port when the controller is in a neutral position, whereby a greater amount of leakage in the associated priority flow control valve may be tolerated.

SUMMARY OF THE INVENTION

The above and other objects of the present invention are accomplished by the provision of an improved closed-center controller for fluid pressure operated devices. The controller comprises a housing having a fluid inlet port, a fluid return port adapted to be connected to reservoir, and a pair of control fluid ports. A valve means is disposed within the housing and defines a neutral position, the valve means including a generally cylindrical, hollow valve member, the housing defines inlet passage means in fluid communication with the fluid inlet port and the valve means defines a first fluid passage means in continuous fluid communication with the inlet passage means, the first fluid passage means being disposed toward one axial end of the valve means. The valve means defines a variable, main flow control orifice having a zero flow area when the valve means is in the neutral position, the orifice having a gradually increasing flow area as the valve means is displaced from neutral and having a maximum flow area capable of passing a maximum system flow. The housing defines a return passage means in fluid communication with the fluid return port and the valve means defines a second fluid passage means in communication between the interior of the hollow valve member, toward the opposite end thereof, and the return passage means. The valve means defines a bypass passage communicating between the first fluid passage means and the interior of the hollow valve member, toward the one axial end thereof. The bypass passage includes a variable bypass orifice having a flow area which is maximum when the valve means is in neutral and progressively decreases to zero as the valve means is displaced from neutral. When the bypass orifice is at a maximum flow area, the bypass passage is capable of passing less than about five percent of the maximum system flow.

DESCRIPTION OF THE PREFERRED EMBODIMENT

Figure 1:
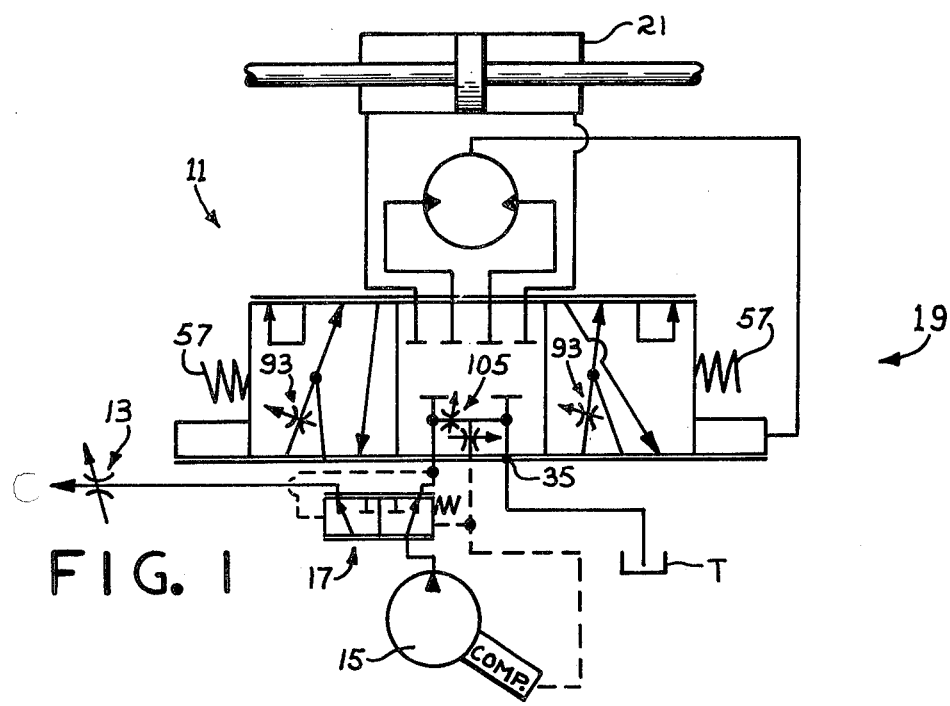
FIG. 1 is a schematic of a simple hydraulic circuit including a fluid controller made in accordance with the present invention.

Referring now to the drawings, which are not intended to limit the present invention, FIG. 1 illustrates schematically a simple hydraulic circuit of the type which may advantageously use the present invention. The circuit includes a hydrostatic power steering system, generally designated 11, and an auxiliary hydraulic circuit which, for purposes of simplicity, is illustrated merely as a variable orifice 13. The circuits 11 and 13 are supplied with pressurized fluid, as required, by a flow and pressure compensated, variable displacement pump 15, the compensator portion of which is shown only in "black box" form, as its operation is well known in the art and forms no part of the present invention.

The output flow from the variable displacement pump 15 enters a priority flow control valve 17, which may be generally of the type illustrated in the above-referenced U.S. Pat. No. 3,455,210, and which is incorporated herein by reference. The priority output from the flow control valve 17 is fed to a closed-center steering control valve, generally designated 19, and shown in cross section FIG. 2. The steering control valve 19 (controller) directs the flow of inlet fluid to either the right end or the left end of a power steering cylinder 21 in response to rotation of the steering wheel W in the appropriate direction. Certain details of the steering control valve 19 shown schematically in FIG. 1 will be referenced in connection with the subsequent description of FIGS. 2 through 5.

The steering control valve 19, which will be described only briefly herein, may be seen in greater detail, and its operation better understood, by reference to U.S. Pat. Nos. 3,801,239 and 3,819,307, assigned to the assignee of the present invention. The steering control valve 19 is comprised of several sections, including a housing 23, a port plate 25, a fluid meter 27, and an end plate 29. These sections are held together in tight sealing engagement by means of a plurality of bolts 31 in threaded engagement with the housing 23.

The housing 23 defines a fluid inlet port 33, a fluid return port 35 and a pair of control fluid ports (not shown in FIG. 2) which, as shown in FIG. 1, are connected to the opposite ends of the cylinder 21.

Rotatably disposed within a valve bore 37 defined by the housing 23 is the valving shown schematically in FIG. 1 which comprises a primary, rotatable valve member (spool) 39 and a cooperating, relatively rotatable follow up valve member (sleeve) 41. At the forward end of the spool 39 is a portion having a reduced diameter and defining a set of internal splines 43 which provide for a direct mechanical connection between the spool 39 and the steering wheel W. The spool 39 and sleeve 41 will be described in greater detail subsequently.

The fluid meter 27, in the subject embodiment, comprises a geroter gear set including an internally toothed stator 45 and an externally toothed rotor 47. The rotor 47 defines a set of internal splines 49, and in splined engagement therewith is a set of external splines 51, formed at the rearward end of a drive shaft 53, the shaft having a bifurcated forward end permitting driving connection between the shaft 53 and the sleeve 41 by means of a pin 55 passing through a pair of circumferentially-elongated pin openings 56 in the spool 39. Thus, pressurized fluid flowing through the valving in response to turning of the spool 39 flows to the fluid meter 27 causing orbital and rotational movement of the rotor 47 within the stator 45. Such movement of the rotor 47 causes follow-up movement of the sleeve 41 by means of the drive shaft 53 and pin 55, to maintain an appropriate relative displacement between the spool 39 and sleeve 41 for a particular rate of rotation of the steering wheel W. A plurality of leaf springs 57, extending through spring openings 58 in the spool 39, urges the sleeve 41 toward the neutral position, relative to the spool 39.

Figure 2:
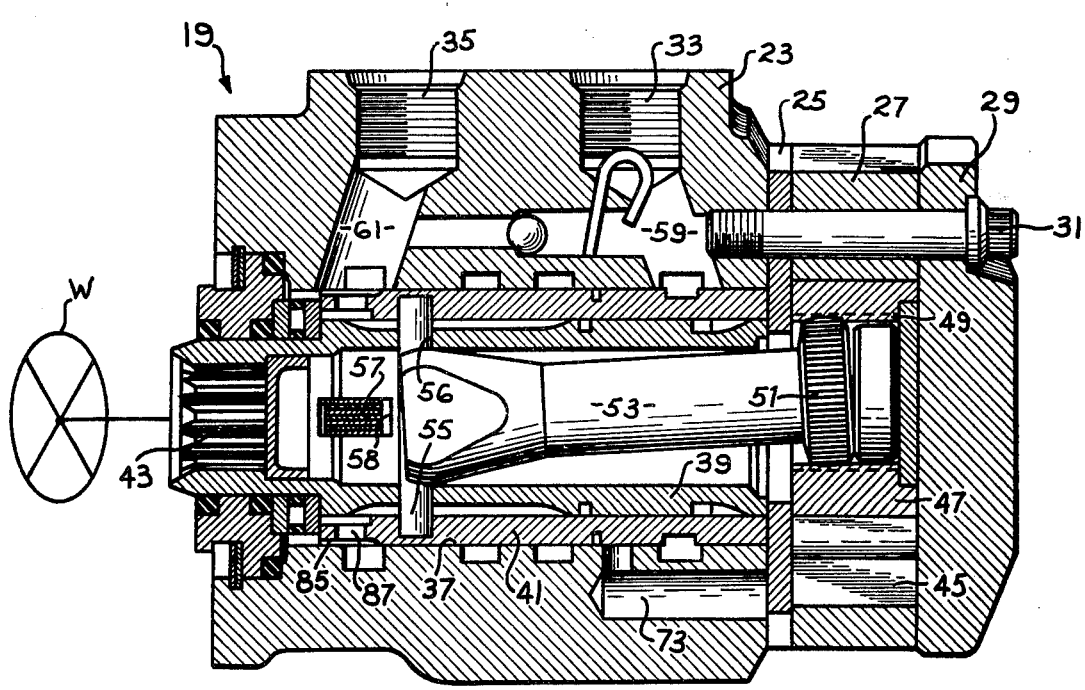
FIG. 2 is an axial cross section of the controller shown schematically in FIG. 1.

Referring still to FIG. 2, it may be seen that pressurized fluid is communicated from the fluid inlet port 33 to the sleeve 41 by means of a fluid passage 59, while return fluid is communicated from the sleeve 41 to the fluid return port 35 by means of a fluid passage 61.

Figure 3:
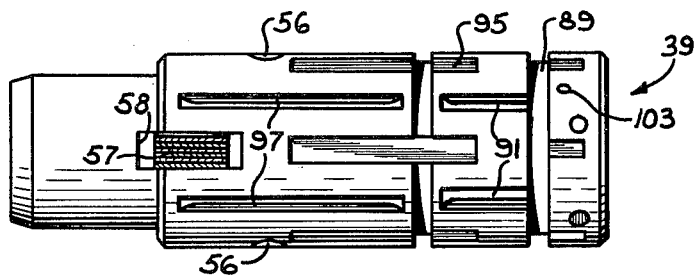
FIG. 3 is an elevation view of the primary valve member utilized in the controller of FIG. 2.
Figure 4:
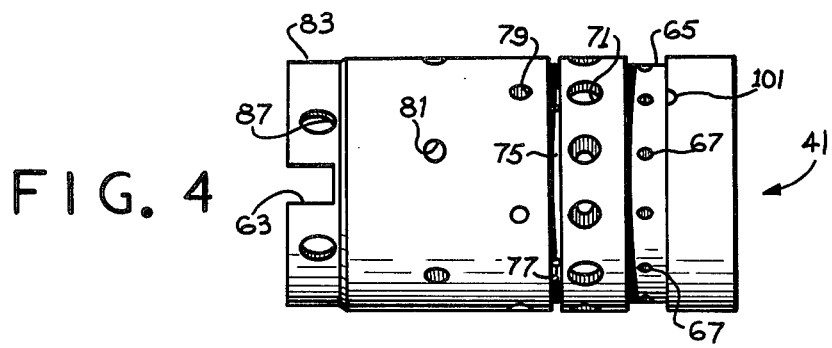
FIG. 4 is an elevation view of the follow-up valve member utilized in the fluid controller of FIG. 2.

Referring now to FIGS. 3 and 4, the spool 39 and sleeve 41 may be seen in greater detail. It should be noted that as shown in FIGS. 3 and 4, the spool 39 and sleeve 41 are in the proper relative axial position, i.e., the right end surface of each is on the same plate. In addition, the spool 39 and sleeve 41 are shown in the proper relative rotational positions to define therebetween the neutral condition illustrated schematically in FIG. 1. Thus, it will be seen that the leaf springs 57 project radially outwardly through oppositely-disposed openings 63, defined at the forward end of the sleeve 41.

Referring now primarily to FIG. 4, the spool 41 defines an annular groove 65 disposed axially to be in continuous fluid communication with the passage 59. Disposed in fluid communication with the groove 65 is a plurality of ports 67 which, in the neutral position, have communication therethrough blocked by the outer surface of the spool 39 thus making the spool 39-sleeve 41 combination closed-center. Adjacent the annular grooves 65 is a plurality of meter ports 71 which communicate between the valving and the expanding and contracting volume chambers of the fluid meter 27 by means of a plurality of axial bores 73 defined by the housing 23 (see FIG. 1). Disposed to the left of the meter ports 71 in FIG. 4 is a small annular groove 75, positioned to communicate with a load sensing port (not shown) defined by the housing 23, such that a load pressure signal is provided by the steering control valve 19 to the priority flow control 17 and to the compensator portion of the variable displacement pump 15. In communication with the annular groove 75 is a plurality of load sensing ports 77 which, as is now well known in the art, communicate a pressure signal from either upstream or downstream of the fluid meter 27 which is representative of the steering load at the cylinder 21. The sleeve 41 also defines a plurality of fluid ports 79 and a plurality of fluid ports 81 disposed such that when the ports 79 communicate metered fluid to one end of the cylinder 21 the ports 81 receive return fluid from the opposite end of the cylinder 21.

At its left end, the sleeve 41 includes a portion 83 having a reduced diameter, such that an annular passage 85 (see FIG. 2) is defined between the valve bore 37 and the reduced portion 83. The reduced portion 83 defines a plurality of openings 87, the function of which will be described subsequently.

Referring now to FIG. 3, the spool 39 defines an annular groove 89, and in communication therewith, a plurality of axial slots 91. When the spool 39 is displaced from the neutral position, relative to the sleeve 41, every other port 67 begins to cooperate with the adjacent slot 91 to define therebetween a variable orifice, the composite of these individual variable orifices being shown schematically, in FIG. 1, as a main flow control orifice 93. Therefore, as used herein, the term "main flow control orifice" will be understood to mean and include a single orifice, or the composite or combination of a plurality of orifices. Each of the slots 91 also communicates with one of the meter ports 71, and metered fluid returning from the fluid meter 27 flows through alternate ones of the meter ports 71 and enters an adjacent axial slot 95, the slots 95 communicating with either the adjacent pressure ports 79 or the adjacent pressure ports 81, depending upon the direction of relative rotation. In either case, fluid returning from the cylinder through the other of the ports 79 or 81 then flows through a respective axial slot 97, the left end of which communicates with the openings 87 such that this return fluid flows through the annular passage 85, and through passage 61 to the fluid return port 35 from where it flows to tank (see FIG. 1).

Figure 5:
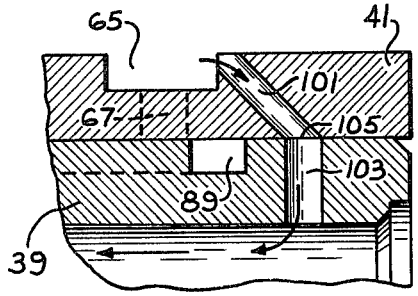
FIG. 5 is an enlarged fragmentary cross section through the primary and follow-up valve members of FIGS. 3 and 4, and on a plane different than that of FIG. 2.

Referring now to the enlarged, fragmentary view of FIG. 5, in conjunction with FIGS. 3 and 4, the sleeve 41 defines a bypass passage 101 which is oriented at an angle of approximately 45° to the axis of rotation of the spool and sleeve. The bypass passage 101 is in continuous, fluid communication with the annular groove 65, such that pressurized fluid from the fluid inlet 33 is always within the passage 101. The spool 39 defines a bypass passage 103, oriented radially through the wall of the spool 39. As shown in FIG. 5, the bypass passage 103 communicates with the interior of the hollow spool 39 adjacent the right end thereof. With the spool 39 and sleeve 41 in the neutral position, as shown in FIG. 5, the bypass passages 101 and 103 are positioned to define a variable bypass orifice 105 (shown schematically in FIG. 1), at the interface of the spool and sleeve. Fluid flowing through the bypass passages 101 and 103 enters the hollow spool 39 (see arrows in FIG. 5) and flows axially through the interior of spool 39 (left in FIGS. 2 and 5) toward the opposite end thereof. This bypass fluid then flows radially outward through the pin openings 56 (each of which communicates with a slot 97) and the spring openings 58. The bypass flow then continues outward through the openings 87, the annular passages 85, passage 61 and finally the fluid return port 35.

It will be understood by those skilled in the art that the provision of the bypass passages 101 and 103 permitting communication between inlet port 33 and return port 35 do not make the steering control valve of the present invention an "open-center" controller, as the amount of bypass flow permitted through the bypass orifice 105 should be about the smallest practical flow rate capable of maintaining the steering control valve 19 at a temperature fairly close to that of the remainder of the hydraulic circuit. Typically, this bypass flow should be less than about five percent of the maximum system flow, i.e., the flow through the hydrostatic power steering circuit 11 when the main flow control orifice 93 is at its maximum flow area. It is important to minimize the bypass flow in order to prevent excessive power consumption by the pump in generating the bypass flow and to be sure that no more of the total system flow capacity is diverted from the rest of the system than is necessary.

Figure 6:
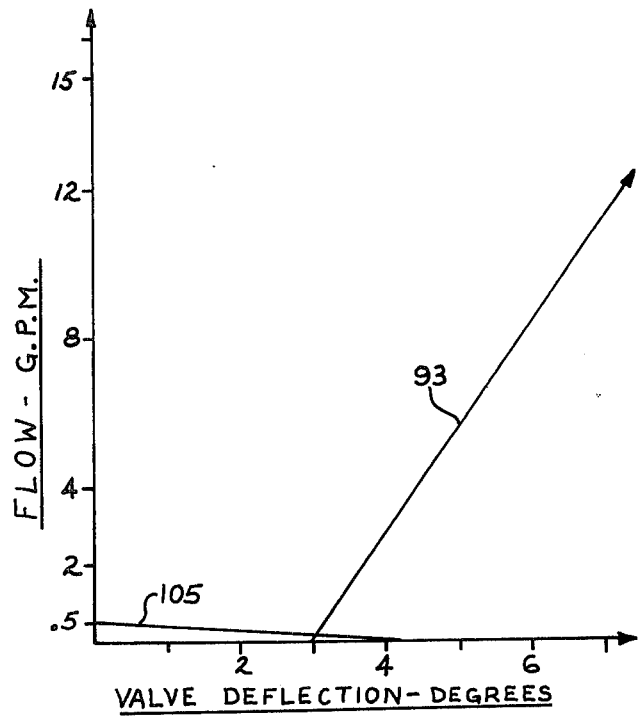
FIG. 6 is a graph of flow area v. valve deflection for certain of the orifices shown schematically in FIG. 1, including the bypass orifice of the present invention.

In the graph of FIG. 6, illustrating flow area v. valve deflection (degrees of relative rotation between the spool and sleeve), it may be seen that in the subject embodiment, the bypass orifice 105 permits a bypass flow of 0.5 gpm (1.88 lpm) in the neutral position, while the main flow control orifice 93 permits a flow through the steering control valve 19 of 15 gpm (54.4 lpm) at maximum valve displacement. Therefore, it has been found that in typical commercial steering control valves to which the present invention may be applied, a bypass flow in the range of about 0.25 gpm (0.94 lpm) to about 0.50 gpm (1.88 lpm) is sufficient to prevent thermal seizure without being excessive and wasteful.

Another important aspect of the present invention is the timing of the closing of bypass orifice 105 and the opening of the main flow control orifice 93. In typical steering control valves, the main flow control orifice begins to open somewhere between two degrees and six degrees from neutral and reaches maximum orifice area after the spool and sleeve have been relatively displaced from neutral at least about eight degrees, and frequently, as much as fifteen or twenty degrees. It should be appreciated by those skilled in the art that as the spool and sleeve are displaced from neutral, less bypass flow is needed to maintain the temperature of the valving because, as soon as the main flow control orifice 93 begins to open, the regular steering flow through the steering control valve 19 will satisfactorily maintain the temperature thereof. Furthermore, it is desirable to eliminate the bypass flow when there is a demand for steering flow so that all of the flow entering inlet port 33 is available to perform the steering function. Accordingly, the closing of the bypass orifice 105 should typically occur when the spool and sleeve are displaced from the neutral position in the range of about three to about six degrees, and in the subject embodiment, the main flow control orifice 93 begins to open at three degrees of valve deflection and the bypass orifice 105 is closed off at about 4° of valve deflection.

The following example is included to illustrate the beneficial effect of the bypass flow in accordance with the present invention. The column headed "CONTROL PRESSURE" indicates approximate pressure drop across the flow control orifice 93, while the column headed "FLUID" gives the temperature of the fluid in the remainder of the hydraulic circuit, and the one headed "SCU" gives the temperature of the steering control valve 19. Temperature readings were taken after several minutes of operation, under what might be considered steady-state temperature conditions.

The data has been divided into two groups by the control pressure and it may be seen that for each group, the temperature differential were quite low and satisfactory, with the exception of the one sample in each group not utilizing the invention (i.e., having a zero bypass flow).

| CONTROL PRESSURE | BYPASS FLOW | TEMPERATURE - °C (°F) | | |
|---|---|---|---|---|
| BAR(PSI) | lpm(gpm) | FLUID | SCU | DIFF. |
| 4.5(65) | 2.03(.54) | 47.8(118) | 47.8(118) | 0(0) |
| 4.5(65) | 2.39(.63) | 66.7(152) | 64.4(148) | 2.3(4) |
| 4.5(65) | 2.01(.54) | 48.9(120) | 45.0(113) | 3.9(7) |
| 4.5(65) | 2.21(.58) | 68.9(156) | 58.9(138) | 10.0(18) |
| 4.5(65) | 2.23(.58) | 68.9(156) | 57.2(135) | 11.7(21) |
| 4.5(65) | 0 (0) | 68.9(156) | 25.6(78) | 43.3(78) |
| 10.3(150) | 3.05(.80) | 48.9(120) | 47.2(117) | 1.7(3) |
| 10.3(150) | 3.75(1.0) | 71.1(160) | 65.5(150) | 5.5(10) |
| 10.3(150) | 3.59(.95) | 60.0(140) | 53.9(129) | 6.1(11) |
| 10.3(150) | 0 (0) | 71.1(160) | 35.6(96) | 35.5(64) |

I claim:

1. A closed-center controller for fluid pressure operated devices, said controller comprising:
   (a) a housing having a fluid inlet port, a fluid return port adapted to be connected to reservoir, and a pair of control fluid ports adapted for connection to a fluid pressure operated device;

(b) valve means disposed within said housing and defining a neutral position, said valve means including a generally cylindrical, hollow valve member;

(c) said housing defining inlet passage means in fluid communication with said fluid inlet port and said valve means defining first fluid passage means in continuous fluid communication with said inlet passage means, said first fluid passage means being disposed toward an axial end of said valve means;

(d) said valve means defining a variable, main flow control orifice having a zero flow area when said valve means is in said neutral position, said orifice having a gradually increasing flow area as said valve means is displaced from said neutral position, said orifice having a maximum flow area capable of passing a maximum system flow;

(e) said housing defining return passage means in fluid communication with said fluid return port and said valve means defining second fluid passage means in continuous fluid communication between the interior of said hollow valve member, toward the opposite axial end thereof, and said return passage means;

(f) said valve means defining bypass passage means communicating between said first fluid passage means and the interior of said hollow valve member, toward said one axial end thereof, said bypass passage means including a variable bypass orifice having a flow area which is a maximum when said valve means is in said neutral position and progressively decreasing toward zero as said valve means is displaced from said neutral position; and (g) said bypass passage means, when said bypass orifice is at a maximum flow area, being capable of passing not more than about five percent of said maximum system flow.

2. A controller as claimed in claim 1 wherein said valve means includes a primary, rotatable valve member comprising said hollow valve member and a cooperating, relatively rotatable follow-up valve member, said primary valve member and said follow-up valve member defining said neutral position relative to each other.

3. A controller as claimed in claim 2 wherein said main flow control orifice is defined at the interface of said primary valve member and said follow-up valve member, and the flow area of said flow control orifice is varied by relative rotation of said primary and follow-up valve members.

4. A controller as claimed in claim 3 wherein said flow control orifice has said maximum flow area when said primary and follow-up valve members have been relatively displaced from said neutral position by at least about 8°.

5. A controller as claimed in claim 4 wherein said flow control orifice begins to open when said primary and follow-up valve members have been relatively displaced from said neutral position in the range of about 2° to about 6°.

6. A controller as claimed in claim 5 wherein said variable bypass orifice is defined at the interface of said primary and follow-up valve members and decreases to a zero flow area when said primary and follow-up valve members have been relatively displaced from said neutral position in the range of about 3 to about 6°.

7. A controller as claimed in claim 2 wherein said first fluid passage means comprises said follow-up valve member defining an annular groove on the outer surface thereof in fluid communication with said inlet passage means and further defining a plurality of ports communicating between said annular groove and said primary valve member.

8. A controller as claimed in claim 7 wherein said bypass passage means comprises said follow-up valve member defining at least one fluid passage oriented at an oblique angle relative to the axis of rotation of said valve members and communicating between said annular groove and the interior of said follow-up valve member, said bypass passage means further comprises said primary valve member defining a fluid port communicating between said fluid passage defined by said follow-up valve member and the interior of said primary valve member.

9. A closed-center controller for fluid pressure operated devices, said controller comprising:

(a) a housing having a fluid inlet port, a fluid return port for connection to a reservoir, and a pair of control fluid ports adapted for connection to a fluid pressure operated device;

(b) valve means disposed within said housing and including a primary, rotatable valve member and a cooperating, relatively rotatable follow-up valve member, said valve defining a neutral position relative to each other, said primary valve member being generally cylindrical and hollow;

(c) said housing defining inlet passage means in fluid communication with said fluid inlet port and said primary and follow-up valve members cooperating to define first fluid passage means in continuous fluid communication with said inlet passage means;

(d) said first fluid passage means including a variable, main flow control orifice having a zero flow area when said primary and follow-up valve members are in said neutral position, the flow area of said flow control orifice gradually increasing as said primary and follow-up valve members are displaced from said neutral position, said flow control orifice having a maximum flow area capable of passing a maximum system flow of at least about 6.0 gpm (22.7 1pm).

(e) said housing defining return passage means in fluid communication with said fluid return port and said primary and follow-up valve members cooperating to define second fluid passage means in continuous fluid communication between the interior of said primary valve member and said return passage means; and (f) said primary and follow-up valve members cooperating to define bypass passage means communicating between said first fluid passage means and the interior of said primary valve member, said bypass passage means including a variable bypass orifice defined at the interface of said primary and follow-up valve members said bypass orifice having a flow area which is a maximum when said primary and follow-up valve members are in said neutral position, said flow area progressively decreasing toward zero as said primary and follow-up valve members are displaced from said neutral position, said bypass passage means permitting a fluid flow therethrough no more than about 0.25 gpm (0.94 1pm) to about 0.5 gpm (1.88 1pm).

* * * * *